US012579839B2

(12) United States Patent
Hijikata

(10) Patent No.: US 12,579,839 B2
(45) Date of Patent: Mar. 17, 2026

(54) INFORMATION PROCESSING APPARATUS, INFORMATION PROCESSING SYSTEM, INFORMATION PROCESSING METHOD, AND PROGRAM

(71) Applicant: NEC Corporation, Tokyo (JP)

(72) Inventor: Kohei Hijikata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 256 days.

(21) Appl. No.: 18/274,450

(22) PCT Filed: Mar. 29, 2021

(86) PCT No.: PCT/JP2021/013308
§ 371 (c)(1),
(2) Date: Jul. 26, 2023

(87) PCT Pub. No.: WO2022/208613
PCT Pub. Date: Oct. 6, 2022

(65) Prior Publication Data
US 2024/0304029 A1      Sep. 12, 2024

(51) Int. Cl.
| | |
|---|---|
| *G06T 7/70* | (2017.01) |
| *G06F 21/32* | (2013.01) |
| *G06T 7/20* | (2017.01) |
| *G06V 40/16* | (2022.01) |
| *G06V 40/60* | (2022.01) |
| *H04N 5/74* | (2006.01) |

(52) U.S. Cl.
CPC ............ *G06V 40/172* (2022.01); *G06F 21/32* (2013.01); *G06T 7/20* (2013.01); *G06T 7/70* (2017.01); *G06V 40/67* (2022.01); *H04N 5/74* (2013.01)

(58) Field of Classification Search
CPC ........ G06V 40/172; G06V 40/67; G06T 7/70; G06T 7/20; G06F 21/32; H04N 5/74
See application file for complete search history.

(56) References Cited

U.S. PATENT DOCUMENTS

| | | | |
|---|---|---|---|
| 2001/0011951 A1 | 8/2001 | Kimata et al. | |
| 2009/0220128 A1 | 9/2009 | Irimoto et al. | |
| 2013/0182915 A1* | 7/2013 | Hanna ..................... | G06F 21/32 |
| | | | 382/116 |

(Continued)

FOREIGN PATENT DOCUMENTS

| | | |
|---|---|---|
| JP | H04-096581 A | 3/1992 |
| JP | 2001-177809 A | 6/2001 |

(Continued)

OTHER PUBLICATIONS

International Search Report for PCT Application No. PCT/JP2021/013308, mailed on Jun. 29, 2021.

(Continued)

*Primary Examiner* — Syed Haider
(74) *Attorney, Agent, or Firm* — Sughrue Mion, PLLC

(57) ABSTRACT

A control is performed such that an imaging device captures an image of an imaging target located across a projection plane at a timing when light transmission of the projection plane is controlled to be in a transparent state, and a control is performed such that a projection image is projected onto the projection plane at a timing when the light transmission of the projection plane is controlled to be in a transparency suppressed state.

8 Claims, 6 Drawing Sheets

(56) References Cited

U.S. PATENT DOCUMENTS

| 2017/0019627 A1* | 1/2017 | Wan | H04N 7/152 |
| 2018/0211098 A1* | 7/2018 | Tanaka | G06V 40/165 |

FOREIGN PATENT DOCUMENTS

| JP | 2006-013856 A | | 1/2006 |
| JP | 2008143220 A | * | 6/2008 |
| JP | 2009-211166 A | | 9/2009 |
| JP | 2010-257249 A | | 11/2010 |
| JP | 2017-183903 A | | 10/2017 |
| WO | 2020/261629 A1 | | 12/2020 |

OTHER PUBLICATIONS

Extended European Search Report for EP Application No. 21934787.
9, dated on Feb. 8, 2024.

* cited by examiner

INFORMATION PROCESSING APPARATUS, INFORMATION PROCESSING SYSTEM, INFORMATION PROCESSING METHOD, AND PROGRAM

This application is a National Stage Entry of PCT/JP2021/013308 filed on Mar. 29, 2021, the contents of all of which are incorporated herein by reference, in their entirety.

TECHNICAL FIELD

The present invention relates to an information processing device, an information processing system, an information processing method, and a program.

BACKGROUND ART

When performing biometric authentication of a person, it is required that the position of the reflection in the captured image of the living body be close to the front position. Patent document 1, patent document 2, and patent document 3 are disclosed as related techniques.

PRIOR ART DOCUMENTS

Patent Documents

Patent Document 1: Japanese Unexamined Patent Application, First Publication No. 2009-211166
Patent Document 2: Japanese Unexamined Patent Application, First Publication No. 2008-143220
[Patent Document 3: Japanese Unexamined Patent Application, First Publication No. 2010-257249
[Patent Document 4: Japanese Unexamined Patent Application, First Publication No. 2017-183903

SUMMARY OF THE INVENTION

Problems to be Solved by the Invention

Patent Document 1 discloses a technique for displaying a guide image that indicates the direction in which the face of the authentication target should be turned during authentication.

Patent Document 2 discloses a technique in which a projector and a display control device are arranged inside a door, and the projector projects and displays an input screen and a guidance screen based on input screen information and guidance screen information acquired through a display control device.

Patent Document 3 discloses that a camera installed inside the vehicle captures images of the outside of the vehicle through a window, and a projector is used to display a warning image on the window, which is a transmissive screen.

Patent Document 4 discloses a technique for controlling a projector to output an illumination image, and a camera to capture the output illumination image.

In the technique for authenticating a user from a captured image, it is required to capture the user at an appropriate position, even when the imaging device and the user to be captured are located across a space separated by a transparent projection plane.

Therefore, an example object of the present invention is to provide an information processing device, an information processing system, an information processing method, and a program, that solve the above problems.

Means for Solving the Problem

According to a first example aspect of the present invention, an information processing device includes: a timing control means that performs a control such that an imaging device captures an image of a capturing target located across a projection plane at a timing when light transmission of the projection plane is controlled to be in a transparent state, and performs a control such that a projection image is projected onto the projection plane at a timing when the light transmission of the projection plane is controlled to be in a transparency suppressed state.

According to a second example aspect of the present invention, an information processing system includes: a timing control means that performs a control such that an imaging device captures an image of a capturing target located across a projection plane at a timing when light transmission of the projection plane is controlled to be in a transparent state, and performs a control such that a projection image is projected onto the projection plane at a timing when the light transmission of the projection plane is controlled to be in a transparency suppressed state.

According to a third example aspect of the present invention, an information processing method includes performing a control such that an imaging device captures an image of a capturing target located across a projection plane at a timing when light transmission of the projection plane is controlled to be in a transparent state, and performs a control such that a projection image is projected onto the projection plane at a timing when the light transmission of the projection plane is controlled to be in a transparency suppressed state.

According to a fourth example aspect of the present invention, a program that causes a computer of an information processing device to function as: a timing control means that performs a control such that an imaging device captures an image of a capturing target located across a projection plane at a timing when light transmission of the projection plane is controlled to be in a transparent state, and performs a control such that a projection image is projected onto the projection plane at a timing when the light transmission of the projection plane is controlled to be in a transparency suppressed state.

Effect of Invention

According to the present invention, a user can be captured at an appropriate position even when the imaging device and the user to be captured, are located across a space separated by a transparent projection plane.

EXAMPLE EMBODIMENT

An authentication system according to one example embodiment of the present invention will be described below with reference to the drawings.

Figure 1:
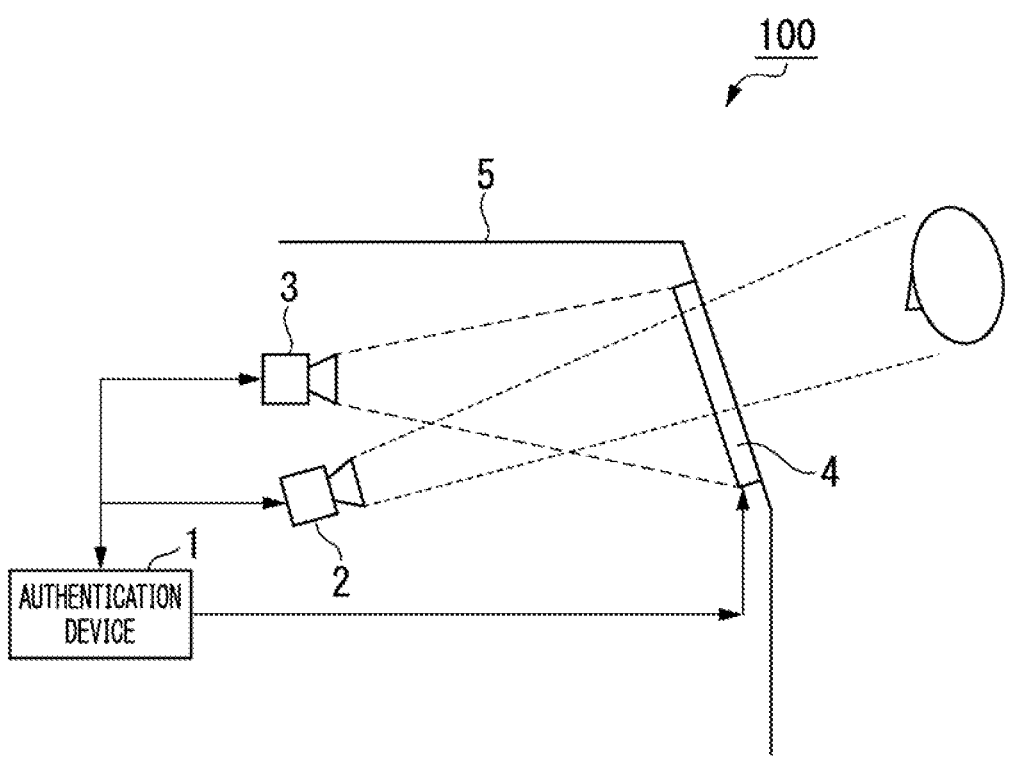
FIG. 1 is a diagram showing an overview of an authentication system including an authentication device according to the present example embodiment.

FIG. 1 is a diagram showing an overview of an authentication system including an authentication device according to the present example embodiment.

As shown in FIG. 1, an authentication system 100, which is one example aspect of an information processing system according to the present example embodiment, is configured by an authentication device 1 (processing device), an imaging device 2, a projection device 3, and a projection plane 4 provided in a vehicle 5. The authentication device 1 may be provided inside a drive recorder, a navigation device, or the like. The projection plane 4 is, for example, the window glass on the side of the driver's seat of the vehicle 5. In the present example embodiment, the window glass forming the projection plane 4 can be controlled to change the degree of light transmission under the control of the authentication device 1.

As an example, a special film is attached to the window glass, and the degree of light transmission changes as the alignment state of the particles in the film changes depending on whether a voltage is turned on or off. The degree of transmission of the projection plane 4 formed by the window glass can be controlled by the control of the authentication device 1, and can be controlled to two states of a light transparent state and a light transparency suppressed state. The light transparent state is, for example, a state in which the transmittance is equal to or greater than a predetermined value and similar to that of ordinary window glass. The light transparency suppressed state is, for example, a state in which the transmittance is less than a predetermined threshold, and the transmittance is reduced like frosted glass by applying a voltage to the film attached to the window glass. The technique of window glass capable of controlling the transmittance is a known technique.

The authentication device 1 controls the imaging device 2 to acquire a captured image of the face of the user to be authenticated. The authentication device 1 controls the projection device 3 to project a guide image (movement guidance information) onto the projection plane 4. The guide image is image information for notifying the user of the movement direction to move to the position to be captured in the captured image. The authentication device 1 controls the degree of transmission of the projection plane 4 at the time of authentication so that the transparent state and the transparency suppressed state are repeatedly switched in a short time. The authentication device 1 captures an image using the imaging device 2 when the projection plane 4 is controlled to be in a transparent state. The authentication device 1 projects the guide image onto the projection plane 4 using the projection device 3, when the projection plane 4 is controlled to be in the transparency suppressed state. By putting the projection plane 4 into the transparency suppressed state, the guide image is reflected on the projection plane 4, and the user to be authenticated can move himself/herself to an appropriate position while viewing the guide image.

Figure 2:
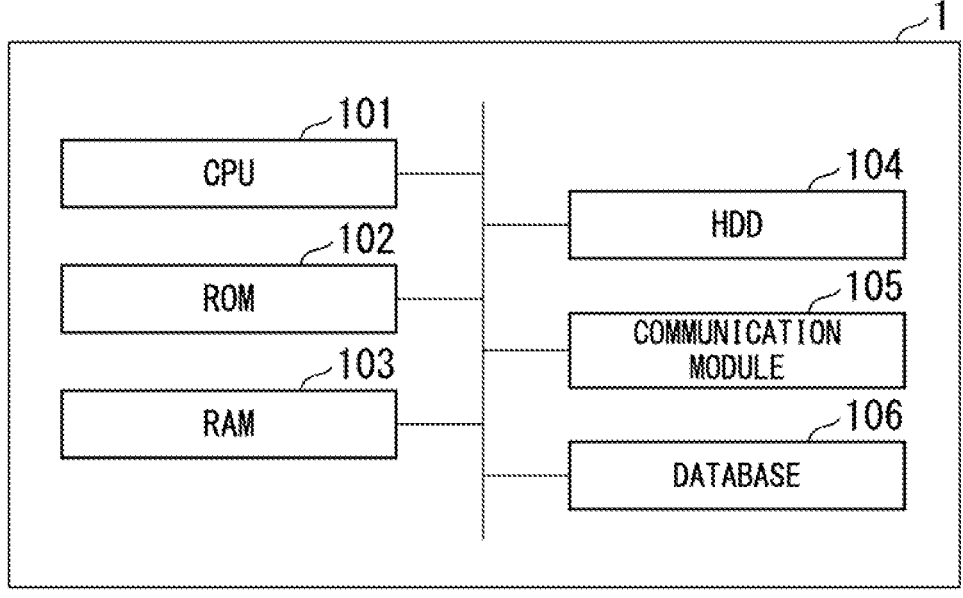
FIG. 2 is a hardware configuration diagram of an authentication device according to the present example embodiment.

FIG. 2 is a hardware configuration diagram of the authentication device.

As shown in this figure, the authentication device 1 is a computer including various hardware such as; a CPU (Central Processing Unit) 101, a ROM (Read Only Memory) 102, a RAM (Random Access Memory) 103, a HDD (Hard Disk Drive) 104, a communication module 105, a database 106, and the like.

Figure 3:
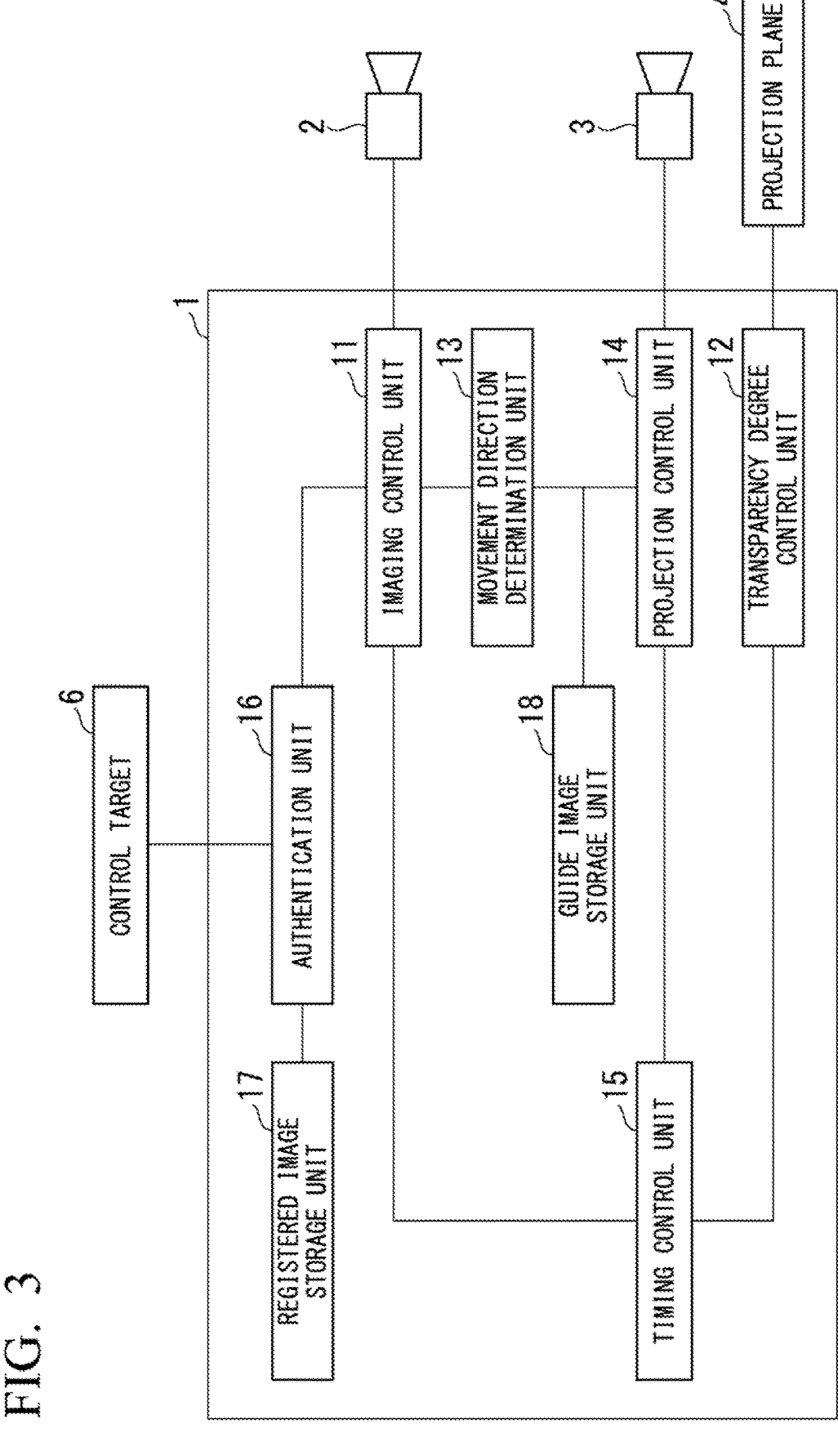
FIG. 3 is a functional block diagram of an authentication device according to the present example embodiment.

FIG. 3 is a functional block diagram of the authentication device.

The authentication device 1 activates an authentication control program. Accordingly, the authentication device 1 exhibits the various functions of, an imaging control unit 11, a transparency degree control unit 12, a movement direction determination unit 13, a projection control unit 14, a timing control unit 15, and an authentication unit 16. The authentication device 1 also stores a registered image storage unit 17 and a guide image storage unit 18.

The imaging control unit 11 performs imaging control of the imaging device 2.

The transparency degree control unit 12 performs change control from the transparent state to the transparency suppressed state, and change control from the transparency suppressed state to the transparent state, of the projection plane 4 where the degree of light transmission is changed.

The movement direction determination unit 13 compares the position of the person in the captured image taken by the imaging device 2, with the position of the person predefined in the captured image, to determine the movement direction in which the person in the captured image moves to the position he/she should be in the captured image.

The projection control unit 14 controls the projection by the projection device 3 onto the projection plane 4, of the guide image indicating the movement direction.

The timing control unit 15 controls the imaging device 2 to capture an image at the timing when the projection plane 4 is controlled to be in the transparent state, and to project the guide image onto the projection plane 4 at the timing when the projection plane 4 is controlled to be in the transparency suppressed state.

The authentication unit 16 performs authentication based on the biometric information of the person appearing in the captured image generated by the imaging device 2 at the timing when the projection plane 4 is controlled to be in the transparent state.

The registered image storage unit 17 stores the face image of the driver.

The guide image storage unit 18 stores guide images.

Figure 4:
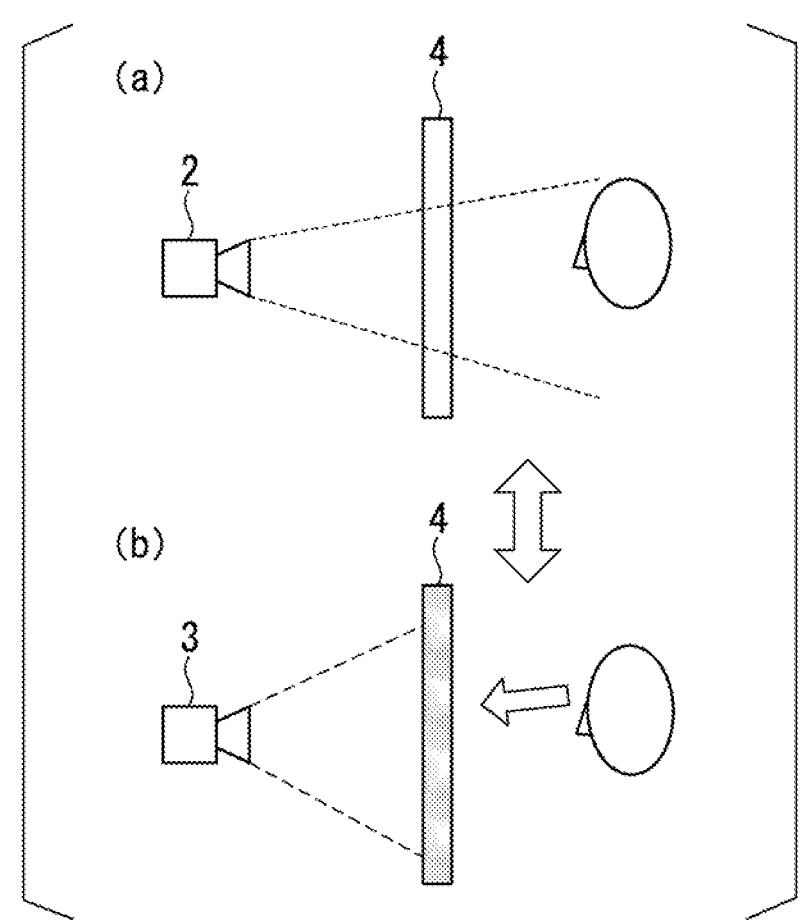
FIG. 4 is a diagram showing an example of switching between a transparent state and a transparency suppressed state according to the present example embodiment.

FIG. 4 is a diagram showing an example of switching between the transparent state and the transparency suppressed state.

FIG. 4(*a*) shows the transparent state. FIG. 4(*b*) shows the transparency suppressed state. The imaging device 2 captures the user's face at the timing when the projection plane 4 is controlled to the transparent state (a). The projection device 3 projects the guide image onto the projection plane 4 at the timing when the projection plane 4 is controlled to the transparency suppressed state (b).

Figure 5:
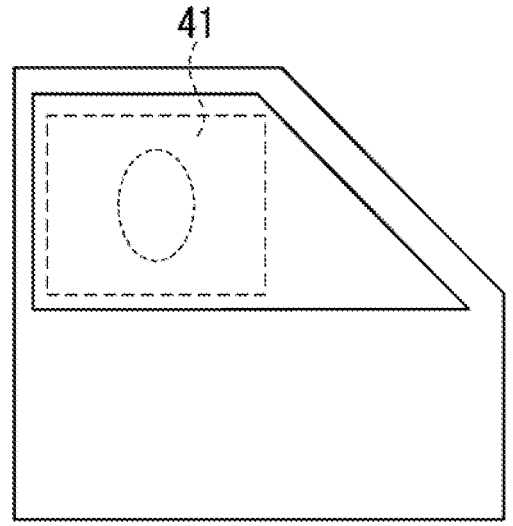
FIG. 5 is a diagram showing a projection example of a guide image according to the present example embodiment.

FIG. 5 is a diagram showing a projection example of the guide image.

Figure 6:
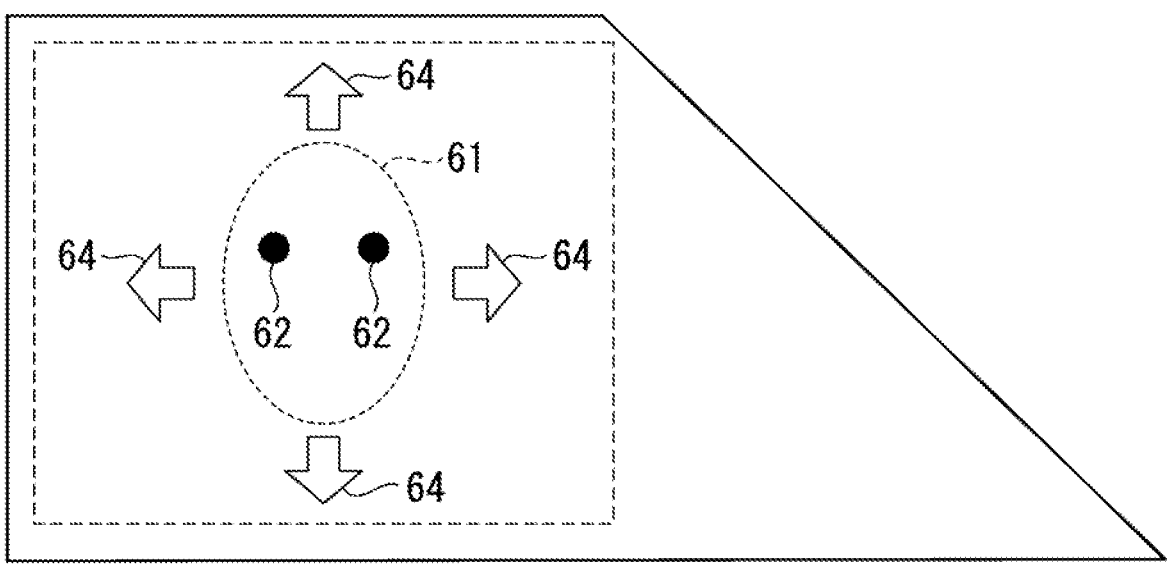
FIG. 6 is a diagram showing the details of the guide image according to the present example embodiment.

FIG. 6 is a diagram showing the details of the guide image.

The guide image is projected onto the window glass of the door of the vehicle 5 as shown in FIG. 5. To explain the guide image in more detail, as an example, the guide image is image information for guiding the user in a moving direction and includes, as shown in FIG. 6, a frame 61 indicating the position of the face, positions 62 of parts of the face such as eyes, and arrows 63 indicating the moving direction of the face.

Figure 7:
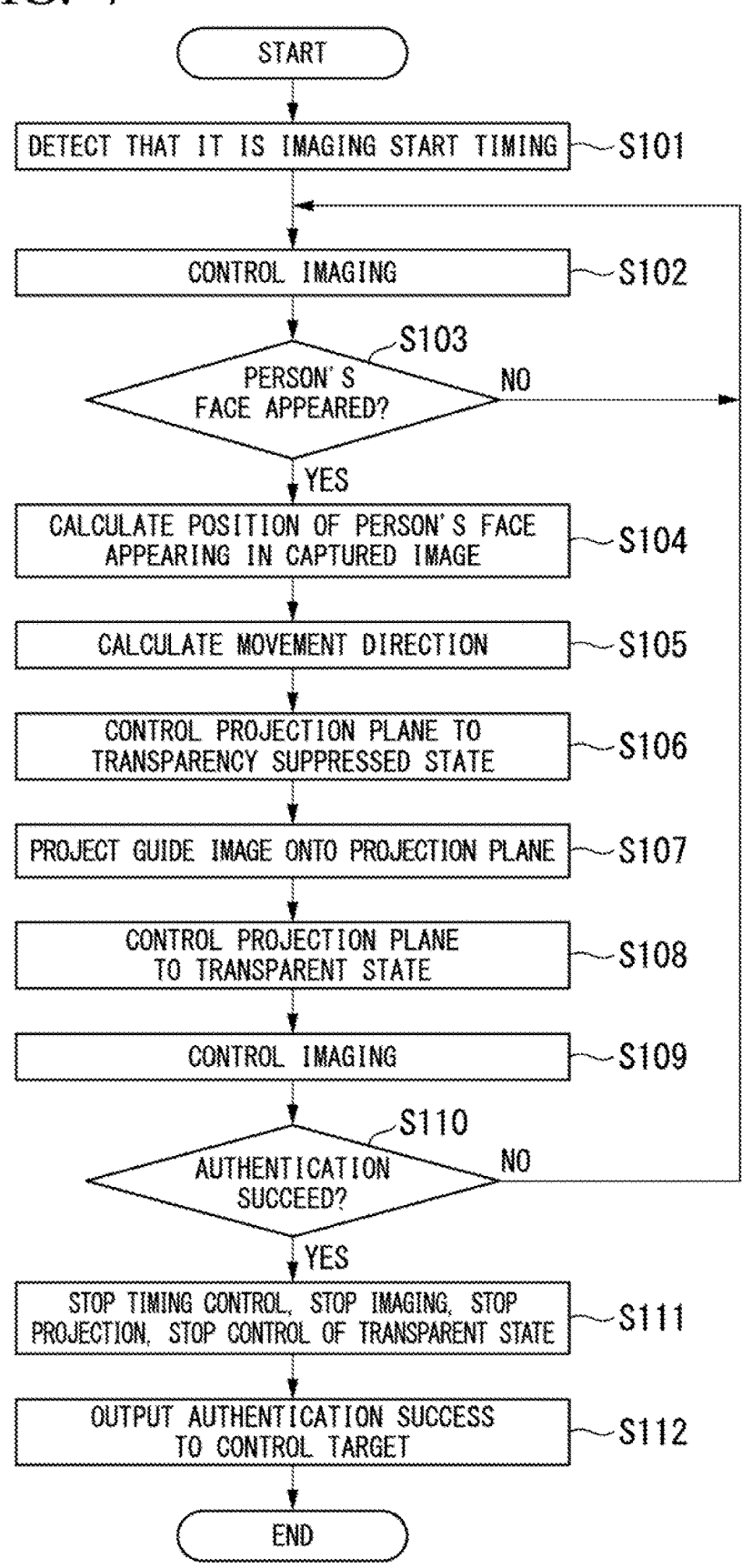
FIG. 7 is a diagram showing a processing flow of the authentication device according to the present example embodiment.

FIG. 7 is a diagram showing the processing flow of the authentication device.

Next, the details of the processing of the authentication device will be explained.

When the imaging control unit 11 detects the imaging start timing, it controls the imaging device 2 to capture an image. For example, when detecting a signal transmitted by a smart key held by the driver of the vehicle 5, the imaging control unit 11 detects that it is imaging start timing (step S101). The imaging control unit 11 may detect that the user is nearby by another method, and detect that it is imaging start timing. The imaging control unit 11 may repeat imaging control using the battery of the vehicle 5 as a power source even when the vehicle 5 is stopped.

When the imaging control unit 11 detects that it is imaging start timing, it controls the imaging of the imaging device 2 (step S102). The imaging control unit 11 acquires a captured image from the imaging device 2. When the imaging control unit 11 acquires the captured image, it outputs an acquisition notification notifying that the captured image has been acquired, to the timing control unit 15. The imaging control unit 11 determines whether or not a person's face is appearing in the captured image (step S103). The imaging control unit 11 outputs the captured image to the movement direction determination unit 13 when a person's face is appearing in the captured image. If the imaging control unit 11 determines that the person's face is not appearing in the captured image, the imaging control unit 11 may repeat capturing. The imaging control unit 11 may control the imaging device 2 so as to capture until the end of capturing is detected. As an example, the imaging control unit 11 may detect that imaging has ended when reception of the signal from the smart key is stopped.

When the movement direction determination unit 13 acquires the captured image, it calculates the position of the person's face appearing in the captured image (step S104). The movement direction determination unit 13 may recognize a face by, for example, a known face recognition technique, and calculate the vertices of a rectangle indicated by the recognition range of the face in the captured image. The movement direction determination unit 13 may calculate the position of the face by another method. The movement direction determination unit 13 compares the position of the face of the person appearing in the captured image with the position of the face of the person defined in advance, and calculates the movement direction for the position of the face of the person in the imaging direction to match with the position of the face of the person defined in advance (step S105). The movement direction determination unit 13 outputs the moving direction to the projection control unit 14. The movement direction determination unit 13 does not need to output the movement direction to the projection control unit 14 when the position of the person's face appearing in the imaging direction matches the predetermined position of the person's face.

When the timing control unit 15 acquires the acquisition notification of the captured image from the imaging control unit 11, it instructs the transparency degree control unit 12 to control the projection plane 4 to the transparency suppressed state. The transparency degree control unit 12 controls the projection plane 4 to be in a transparency suppressed state (step S106). When the transparency degree control unit 12 controls to the transparency suppressed state, it outputs a state notification indicating the transparency suppressed state, to the timing control unit 15. When the timing control unit 15 acquires the state notification of the transparency suppressed state, it outputs an instruction notification for instructing projection, to the projection control unit 14.

When the projection control unit 14 acquires the moving direction, it acquires from the guide image storage unit 18 a guide image showing; an arrow 63 corresponding to the moving direction prompting the face to move in that moving direction, a frame 61 indicating the position of the face, and a position 62 of the eyes. Upon acquiring the instruction notification from the timing control unit 15, the projection control unit 14 projects the guide image onto the projection plane 4 (step S107). As a result, the guide image is projected onto the projection plane 4 in the transparency suppressed state.

Since the guide image is projected on the projection plane 4 in the transparency suppressed state, the user located outside the vehicle 5 can visually recognize the guide image projected on the projection plane 4. The user confirms the guide image and moves his/her standing position and face position. At this time, the user moves his or her eyes so that they face the eye positions 62 displayed in the guide image.

When the projection control unit 14 projects the guide image, it outputs a projection notification to the timing control unit 15 indicating that it has been projected. When the timing control unit 15 recognizes that the projection image has been projected for a predetermined period of time, the timing control unit 15 outputs stop information indicating projection stop to the projection control unit 14, and outputs instruction information to instructs the transparency degree control unit 12 to control from the transparency suppressed state to the transparent state. The transparency degree control unit 12 performs control from the transparency suppressed state to the transparent state (step S108). The projection control unit 14 stops projecting the projection image based on the control of the timing control unit 15 at the timing of switching from the transparency suppressed state to the transparent state.

The timing control unit 15 outputs instruction information instructing the imaging control unit 11 to capture an image at the timing of switching from the transparency suppressed state to the transparent state. The imaging control unit 11 controls imaging of the imaging device 2 at the timing of switching from the transparency suppressed state to the transparent state (step S109). The timing control unit 15 determines whether information indicating successful authentication has been acquired from the authentication unit 16 (step S110). The timing control unit 15 repeats the process from step S102 when the information indicating the authentication success has not been acquired. When the timing control unit 15 acquires information indicating successful authentication from the authentication unit 16, it stops timing control, instructs the imaging control unit 11 to stop imaging, instructs the projection control unit 14 to stop projection of the guide image, and stops control of the transparent state of the projection plane 4 (step S111).

Through the above-described processing, the person is captured in the transparent state and the guide image is projected onto the projection plane 4 in the transparency suppressed state, until the authentication unit 16 succeeds in authentication. The imaging control unit 11 outputs the captured image to the authentication unit 16 each time it acquires a captured image from the imaging device 2. When acquiring the captured image, the authentication unit 16 acquires a registered image of the driver's face registered in the registered image storage unit 17. The authentication unit 16 performs authentication processing by comparing the captured image and the registered image. A known technique may be used for this authentication processing.

The authentication unit 16 outputs authentication success to the timing control unit 15 when the authentication process is successful. Further, when the authentication process is successful, the authentication unit 16 outputs authentication success to a control target 6 (step S112). For example, the control target 6 is a door unlocking device, and the unlocking device unlocks the doors of the vehicle 5 when information indicating successful authentication is output.

According to the above processing, under the control of the authentication device provided inside the vehicle 5, the imaging device 2 inside the vehicle 5 captures the person to be authenticated at the timing when the projection plane 4 is in the transparent state, and the projection device 3 inside the vehicle 5 projects the guide image onto the projection plane 4 at the timing when the projection plane 4 is in the transparency suppressed state. Then, the timing control unit 15 performs control to switch the projection plane 4 between the transparent state and the transparency suppressed state, controls the imaging control unit 11 so that the image is captured in the transparent state, and controls the transparency degree control unit 12 so that the projection image is projected in the transparency suppressed state. Also, the timing control unit 15 repeats these controls until it determines that the authentication is successful. Note that the timing control unit 15 switches between capturing in the transparent state of the projection plane 4, and projection of the guide image onto the projection plane 4 in the transparency suppressed state, in a short time such as several tens of milliseconds or several hundred milliseconds. As a result, the user can recognize that the guide image is projected on the projection plane 4 without flickering, and can perform authentication while viewing the guide image in a situation in which discomfort due to flickering of the guide image is reduced.

Figure 8:
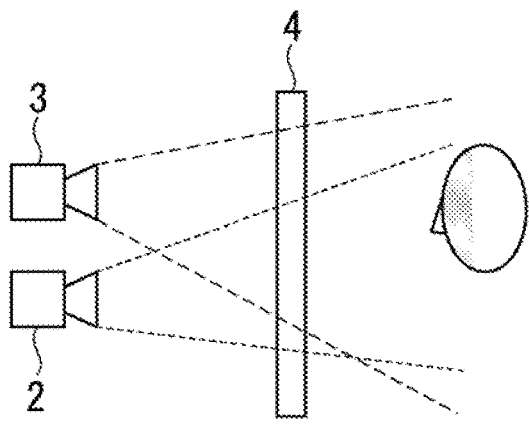
FIG. 8 is a diagram showing another control state in the transparent state according to the present example embodiment.

FIG. 8 is a diagram showing another control state in the transparent state.

In the above example, in the transparent state, the timing control unit 15 controls the projection control unit 14 to stop projecting the guide image onto the projection plane 4. However, the timing control unit 15 may control to continue projection, without instructing the projection control unit 14 to stop projection even in the transparent state. However, in the transparent state, since the projection plane 4 transmits light, the light of the guide image passes through the projection plane 4 and that light hits the user to be authenticated. In this situation, the imaging device 2 captures the user's face. As a result, the imaging device 2 can generate a captured image in which the user's face appears bright, even in a dark situation such as at night.

It should be noted that the timing control unit 15 may perform control to project the guide image at the timing when the projection plane 4 is controlled to be in the transparent state, when a low brightness environment is detected. For example, when the luminance of the background of a person appearing in the captured image is less than a predetermined threshold, or when the value obtained from an illuminance sensor or the like is the illuminance of night or a dark place, the timing control unit 15 may detect a low brightness environment. Alternatively, the timing control unit 15 may acquire authentication score information indicated by the authentication result from the authentication unit 16, and determine that the capturing condition of the face is poor when the value of the authentication score is lower than the threshold value, and control so that a guide image is projected at the timing when the projection plane 4 is controlled to a transmission state.

In the above-described processing, the imaging control unit 11 may determine that the distance to the person is an appropriate distance based on the size of the person's face in the captured image, output an acquisition notification to the timing control unit 15 to notify that the captured image was acquired, output the captured image to the authentication unit 16, and output the captured image to the movement direction determination unit 13.

As described above, according to the processing of the above-described authentication device, even when the imaging device and the user to be captured are located across a space separated by a transparent projection plane, the user can be captured at an appropriate position.

In the present example embodiment, in the authentication system 100, the authentication device 1, the imaging device 2, and the projection device 3 are provided inside the vehicle 5, and the authentication device 1 controls so as to project a guide image using the window glass of the vehicle as the projection plane 4. However, in another example embodiment, the authentication device 1, the imaging device 2, and the projection device 3 may be provided in a closed space such as a room, and the authentication device 1 may repeatedly perform control of projecting the guide image on a projection surface 4 separating the closed space and the outside, in a transparency suppressed state, and control of capturing in a transparent state. Note that the projection plane 4 may be a transparent member other than the window glass as long as it can be controlled between the transparent state and the transparency suppressed state.

Moreover, in the example embodiment described above, the description used the example of a case where the projection plane 4 is the window glass next to the driver's seat, but any window glass (e.g. windshield) around the vehicle 5 may be configured as the projection surface 4.

Also, in each of the above-described example embodiments, the authentication device 1 provided in the vehicle 5 performs each of the above-described processes. However, part of these processes may be performed by an external computer device such as an authentication server connected for communication with the authentication device 1. For example, the authentication system 100 is configured by the authentication device 1 and an authentication server. The authentication system 100 may have the functions of the authentication unit 16 and the registered image storage unit 17, and the authentication server may similarly perform the authentication process. The authentication device 1 acquires the authentication result from the authentication server, and performs subsequent processing based on the result in the same manner as the above-described processing.

Figure 9:
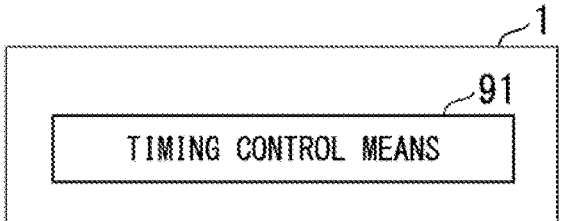
FIG. 9 is a diagram showing a minimum configuration of the authentication device according to the present example embodiment.

FIG. 9 is a diagram showing the minimum configuration of the authentication device.

Figure 10:
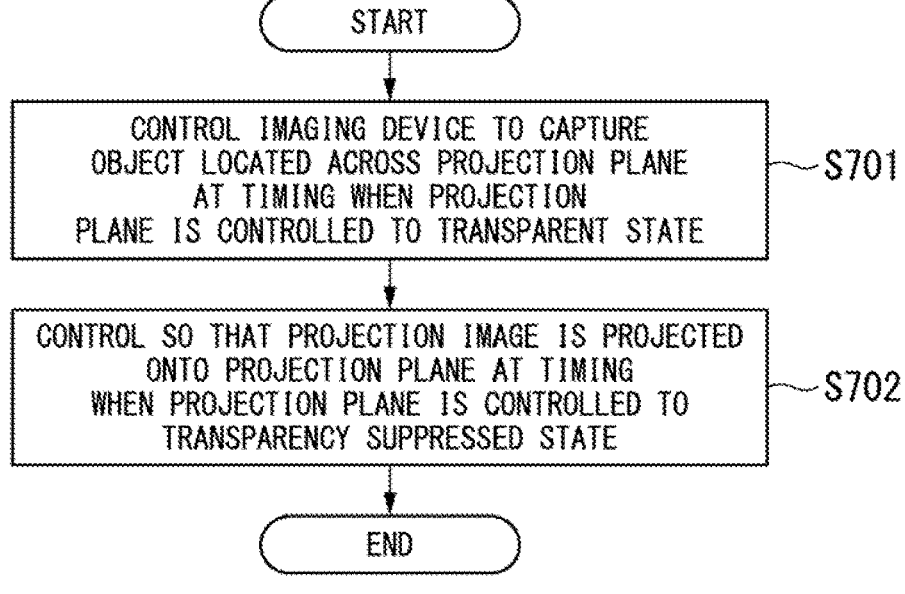
FIG. 10 is a diagram showing a processing flow of the authentication device with a minimum configuration according to the present example embodiment.

FIG. 10 is a diagram showing the processing flow of an authentication device with a minimum configuration.

The authentication device 1 includes at least timing control means 91.

The timing control means 91 controls the imaging device 2 to capture an image of an object located across the projection plane 4 at the timing when the transmission of the light through the projection plane 4 is controlled to the transparent state (step S701), and performs control so that the projection image is projected onto the projection plane 4 at the timing when the transmission of light of the projection plane 4 is controlled to the transparency suppressed state (step S702).

Each of the devices mentioned above has a computer system inside. Each process described above is stored in a computer-readable recording medium in the form of a program, and the above processes are performed by reading and executing this program by a computer. Here, the computer-readable recording medium refers to a magnetic disk, a magneto-optical disk, a CD-ROM, a DVD-ROM, a semiconductor memory, and the like. Alternatively, the computer program may be distributed to a computer via a communication line, and the computer receiving the distribution may execute the program.

Also, the above program may be for realizing part of the functions described above. Further, it may be a so-called difference file (difference program) that can realize the above-described functions in combination with a program already recorded in the computer system.

DESCRIPTION OF REFERENCE SYMBOLS

1 Authentication device (information processing device)
2 Imaging device
3 Projection device
4 Projection plane
11 Imaging control unit
12 Transparency degree control unit
13 Movement direction determination unit
14 Projection control unit
15 Timing control section
16 Authentication unit
17 Registered image storage unit
18 Guide image storage unit
What is claimed is:

1. An information processing device comprising:
a memory configured to store instructions; and
a processor configured to execute the instructions to:
  perform a control such that a camera captures an image of a capturing target located across a projection plane at a timing when light transmission of the projection plane is controlled to be in a transparent state;
  perform a control such that a projection image is projected onto the projection plane at a timing when the light transmission of the projection plane is controlled to be in a transparency suppressed state;
  perform imaging control of the camera;
  compare a position of a person appearing in the captured image with a predefined position, and determine a movement direction in which the person appearing in the captured image moves to a position where the person is required to appear in the captured image; and
  control projection by a projector onto the projection plane, of movement guidance information indicating the movement direction.

2. The information processing device according to claim 1, wherein the processor is configured to execute the instructions to acquire the captured image at the timing when the projection plane is controlled to be in the transparent state, and perform authentication processing based on face information of the person who is the capturing target appearing in the captured image.

3. The information processing device according to claim 1, wherein the processor is configured to execute the instructions to perform change control from the transparent state to the transparency suppressed state, and change control from the transparency suppressed state to the transparent state, of the projection plane where a degree of the light transmission is changed.

4. The information processing device according to claim 1, wherein the camera captures an image of the person located across the projection plane.

5. The information processing device according to claim 1, wherein the processor is configured to execute the instructions to perform control to project the movement guidance information onto the projection plane at the timing when the projection plane is controlled to be in the transparent state, when a low brightness environment is detected.

6. The information processing device according to claim 1, wherein the movement guidance information is image information that displays parts of a face of the person and the movement direction on the projection plane.

7. An information processing method comprising:
performing a control such that a camera captures an image of a capturing target located across a projection plane at a timing when light transmission of the projection plane is controlled to be in a transparent state;
performing a control such that a projection image is projected onto the projection plane at a timing when the light transmission of the projection plane is controlled to be in a transparency suppressed state;
performing imaging control of the camera;
comparing a position of a person appearing in the captured image with a predefined position, and determining a movement direction in which the person appearing in the captured image moves to a position where the person is required to appear in the captured image; and
controlling projection by a projector onto the projection plane, of movement guidance information indicating the movement direction.

8. A non-transitory computer-readable medium that stores a program that causes a computer to execute:
performing a control such that a camera captures an image of a capturing target located across a projection plane at a timing when light transmission of the projection plane is controlled to be in a transparent state;
performing a control such that a projection image is projected onto the projection plane at a timing when the light transmission of the projection plane is controlled to be in a transparency suppressed state;
performing imaging control of the camera;
comparing a position of a person appearing in the captured image with a predefined position, and determining a movement direction in which the person appearing in the captured image moves to a position where the person is required to appear in the captured image; and
controlling projection by a projector onto the projection plane, of movement guidance information indicating the movement direction.

* * * * *